United States Patent
Shao et al.

(10) Patent No.: US 12,461,354 B2
(45) Date of Patent: Nov. 4, 2025

(54) POINT-SCANNING STRUCTURED ILLUMINATION-BASED SUPER-RESOLUTION MICROSCOPIC IMAGING SYSTEM AND METHOD

(71) Applicant: SHENZHEN UNIVERSITY, Shenzhen (CN)

(72) Inventors: Yonghong Shao, Shenzhen (CN); Xiaomin Zheng, Shenzhen (CN); Meiting Wang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 335 days.

(21) Appl. No.: 18/366,357

(22) Filed: Aug. 7, 2023

(65) Prior Publication Data

US 2023/0384572 A1     Nov. 30, 2023

Related U.S. Application Data

(63) Continuation of application No. PCT/CN2021/108962, filed on Jul. 28, 2021.

(30) Foreign Application Priority Data

Aug. 7, 2020   (CN) .......................... 202010788137.3

(51) Int. Cl.
    G02B 21/00     (2006.01)
(52) U.S. Cl.
    CPC ..... G02B 21/0076 (2013.01); G02B 21/0032 (2013.01); G02B 21/0072 (2013.01)
(58) Field of Classification Search
    CPC ............ G02B 21/0076; G02B 21/0032; G02B 21/0072; G02B 21/00; G02B 21/0004;
    (Continued)

(56) References Cited

U.S. PATENT DOCUMENTS

| 2013/0256564 A1 | 10/2013 | Hell et al. |
| 2016/0187259 A1 | 6/2016 | Vicidomini et al. |

(Continued)

FOREIGN PATENT DOCUMENTS

| CN | 101821607 A | 9/2010 |
| CN | 109632735 A | 4/2019 |

(Continued)

OTHER PUBLICATIONS

Jialin Wang et al., "Dual-color STED super-resolution microscope using a single laser source", Journal of Biophotonics, May 2020, vol. 13, No. 8, Entire document.

(Continued)

*Primary Examiner* — Arnel C Lavarias

(57) ABSTRACT

A point-scanning structured illumination-based super-resolution microscopic imaging system includes a first laser assembly, a second laser assembly, a scanner, a detector and a computing terminal. The first laser assembly and the second laser assembly are configured to generate an excitation light and an annular STED light, respectively. The scanner is configured to control the excitation light and the annular STED light to scan and excite a sample. The detector is configured to acquire fluorescence signals to obtain fluorescence-structured images. The computing terminal is configured to reconstruct a super-resolution image based on the fluorescence-structured images. A microscopic imaging method is also provided, in which the to-be-imaged sample is scanned and excited by an excitation light and an annular STED light to obtain a stripe structured-light image beyond the diffraction limit, and the fluorescence signals are collected by a detector synchronously and pointwise in real time.

10 Claims, 2 Drawing Sheets

(58) Field of Classification Search
CPC .............. G02B 21/002; G02B 21/0024; G02B 21/0036; G02B 21/0048; G02B 21/0052; G02B 21/008; G02B 21/06; G02B 21/36; G02B 21/361; G02B 21/365; G02B 21/367; G01N 21/6456; G01N 21/6458; G01N 2021/6463; G01N 2021/6471; G01N 21/6486
USPC ....... 359/368, 362, 363, 369, 385, 387, 388, 359/389, 390
See application file for complete search history.

(56) References Cited

U.S. PATENT DOCUMENTS

| | | | |
|---|---|---|---|
| 2016/0274439 A1* | 9/2016 | Bianchini | G01N 21/6456 |
| 2017/0031145 A1* | 2/2017 | Takiguchi | G01N 21/6458 |

FOREIGN PATENT DOCUMENTS

| | | |
|---|---|---|
| CN | 110836876 A | 2/2020 |
| CN | 110954520 A | 4/2020 |
| CN | 110954523 A | 4/2020 |
| CN | 110954524 A | 4/2020 |
| CN | 111982870 A | 11/2020 |
| WO | 2017174100 A1 | 10/2017 |
| WO | 2019077556 A1 | 4/2019 |

OTHER PUBLICATIONS

Virginie Hamel et al., "Correlative multicolor 3D SIM and STORM microscopy",Biomedical Optics Express, Oct. 2014, vol. 5, No. 10, pp. 3326-3336.

Ziyi Zhang et al.,"Application of Second Harmonic Generation in Biomedical Imaging", Chinese Journal of Lasers, Feb. 2020, vol. 47, No. 2, pp. 1-12.

* cited by examiner

POINT-SCANNING STRUCTURED ILLUMINATION-BASED SUPER-RESOLUTION MICROSCOPIC IMAGING SYSTEM AND METHOD

CROSS-REFERENCE TO RELATED APPLICATIONS

This application is a continuation of International Patent Application No. PCT/CN2021/108962, filed on Jul. 28, 2021, which claims the benefit of priority from Chinese Patent Application No. 202010788137.3, filed on Aug. 7, 2020. The content of the aforementioned application, including any intervening amendments thereto, is incorporated herein by reference in its entirety.

TECHNICAL FIELD

This application relates to optical microscopic imaging, and more particularly to a point-scanning structured illumination-based super-resolution microscopic imaging system and method.

BACKGROUND

Fluorescence microscopy is a non-destructive and non-invasive technique with high labeling specificity, and can perform real-time dynamic imaging of living cells, and thus it has been widely used in life science research. However, as limited by the diffraction limit of light, the highest resolution of conventional fluorescence microscopy can only reach $\sim\lambda/2$, about 200 nm, in which $\lambda$ is optical wavelength.

To break the limitation of diffraction limit on the resolution of fluorescence microscopy, a series of novel super-resolution microscopic imaging methods have been developed and proposed, such as stochastic optical reconstruction microscopy (STORM) technique, stimulated emission depletion (STED) technique, structured illumination microscopy (SIM) technique, and saturated structured illumination microscopy (SSIM) technique. The STORM technique requires tens of thousands of raw images, which limits the imaging speed. The STED technique requires a high-power STED beam to de-excite the fluorescent molecules, and the higher the required resolution, the higher the power of the STED beam required, which limits the application of the STED technique. The SIM imaging technique can be performed with common fluorophores and low excitation light intensity, but the imaging resolution can only be improved by two times because of the diffraction limit. The SSIM imaging technique requires an extremely high optical power to achieve saturated excitation of fluorescent molecules, which is not applicable to live cell imaging and cannot fully show advantages of the SIM.

Therefore, the existing technology needs to be further improved.

SUMMARY

An object of the present disclosure is to provide a point-scanning structured illumination-based super-resolution microscopic imaging system and method to overcome the problems in the existing imaging techniques, for example, the STORM technique has a low imaging efficiency; it is required to increase the power of the STED beam to improve the imaging resolution of the STED technique; and the existing structured illumination microscopy technology needs saturated excitation to improve the resolution, and is unable to realize the super-resolution imaging on the order of several tens of nanometers under the condition of low-power excitation.

The technical solutions of the present disclosure are described below.

In a first aspect, this application provides a point-scanning structured illumination-based super-resolution microscopic imaging system, comprising:

a first laser assembly;
a second laser assembly;
a scanner;
a detector; and
a computing terminal;
wherein the first laser assembly is configured to generate an excitation light whose intensity varies sinusoidally with time;
the second laser assembly is configured to generate an annular stimulated emission depletion (STED) light;
the scanner is configured to control the excitation light and the annular STED light to scan and excite a to-be-imaged sample to generate fluorescence signals;
the detector is configured to acquire the fluorescence signals to obtain a plurality of fluorescence-structured images in different orientations and phases; and
the computing terminal is configured to extract frequency components of each of the plurality of fluorescence-structured images, and reconstruct a plurality of local super-resolution images of the to-be-imaged sample in different orientations based on the frequency components, and synthesize an integral super-resolution image of the to-be-imaged sample based on the plurality of local super-resolution images.

In an embodiment, the first laser assembly comprises a first laser, an intensity modulator, a first excitation filter, and a first reflector;

the first laser is configured to generate a first laser light;
the intensity modulator is configured to modulate the first laser light into the excitation light whose intensity varies sinusoidally with time;
the first excitation filter is configured to filter the excitation light; and
the first reflector is configured to reflect the excitation light after filtered by the first excitation filter to the scanner.

In an embodiment, the second laser assembly comprises a second laser, a vortex phase plate, a second excitation filter and a first beam splitter;

the second laser is configured to generate a second laser light;
the vortex phase plate is configured to modulate the second laser light into the annular STED light;
the second excitation filter is configured to filter the annular STED light; and
the first beam splitter is configured to reflect the annular STED light after filtered by the second excitation filter to the scanner.

In an embodiment, the point-scanning structured illumination-based super-resolution microscopic imaging system further comprises:

a first objective lens;
a pinhole; and
a second objective lens;
wherein the first objective lens is configured to converge the excitation light reflected by the first reflector and the annular STED light reflected by the first beam splitter to the pinhole;

the pinhole is configured to perform spatial filtering on the excitation light and the annular STED light converged by the first objective lens; and the second objective lens is configured to collimate the excitation light and the annular STED light after the spatial filtering onto the scanner.

In an embodiment, the point-scanning structured illumination-based super-resolution microscopic imaging system further comprises:

a scanning lens;

a tube lens; and a third objective lens;

wherein the scanning lens is configured to receive and expand the excitation light and the annular STED light emitted from the scanner to emit an expanded excitation light and an expanded annular STED light;

the tube lens is configured to receive and collimate the expanded excitation light and the expanded annular STED light to emit a collimated excitation light and a collimated annular STED light; and the objective lens is configured to receive the collimated excitation light and the collimated annular STED light, and focus the collimated excitation light and the collimated annular STED light onto the to-be-imaged sample for excitation to produce the fluorescence signals.

In an embodiment, the point-scanning structured illumination-based super-resolution microscopic imaging system further comprises:

a second beam splitter mirror;

wherein the second beam splitter is configured to reflect the fluorescence signals generated by the to-be-imaged sample to the detector.

In an embodiment, the point-scanning structured illumination-based super-resolution microscopic imaging system further comprises:

an emission filter; and a first optical lens;

wherein the emission filter is configured to filter the fluorescence signals reflected by the second beam splitter; and the first optical lens is configured to converge filtered fluorescence signals to the detector.

In an embodiment, a modulation function of the intensity modulator is $$I_{ex}(r) = \frac{1}{2}[1 + \cos(\omega_t t \pm \varphi)];$$

wherein $I_{ex}(r)$ represents an intensity of the excitation light on an imaging plane of the to-be-imaged sample; r represents an arbitrary position on the to-be-imaged sample; $\omega_t$ represents a time modulation frequency; t represents time; and $\varphi$ represents an initial phase.

In a second aspect, this application provides a point-scanning structured illumination-based super-resolution microscopic imaging method, comprising:

(S1) scanning and exciting, by an excitation light generated by a first laser assembly and an annular STED light generated by a second laser assembly, a to-be-imaged sample to generate fluorescence signals, wherein an intensity of the excitation light changes sinusoidally with time;

(S2) collecting the fluorescence signals to obtain a plurality of fluorescence-structured images in different orientations and phases;

(S3) extracting frequency components of the plurality of fluorescence-structured images; and reconstructing a plurality of local super-resolution images of the to-be-imaged sample in different orientations according to the frequency components; and (S4) synthesizing an integral super-resolution image of the to-be-imaged sample according to the plurality of local super-resolution images.

In an embodiment, step (S3) comprises:

(S31) extracting the frequency components of the plurality of fluorescence-structured images; resetting and linearly integrating frequency components of images of the same orientation among the plurality of fluorescence-structured images to obtain integrated frequency component values of the fluorescence-structured images; and (S32) performing a Fourier inverse transform on each of the integrated frequency component values to obtain the plurality of local super-resolution images of the to-be-imaged sample in the different orientations.

Compared to the prior art, this application has the following beneficial effects.

This application provides a point-scanning structured illumination-based super-resolution microscopic imaging system and method. In this application, a to-be-imaged sample is scanned and excited by an excitation light whose intensity varies sinusoidally with time and an annular STED light to obtain a stripe structured illumination image which exceeds the diffraction limit. A detector is configured to synchronously collect the fluorescence signal point by point in real time, and super-resolution images are reconstructed through the algorithm. Compared with the conventional STED technology, the method provided herein can improve the resolution by 2 times, that is, the method provided herein can achieve tens of nano-meters or even higher resolution imaging under low power excitation conditions.

BRIEF DESCRIPTION OF THE DRAWINGS

To illustrate the technical solutions in the embodiments of the present disclosure or in the prior art more clearly, the accompanying drawings needed in the description of the embodiments or the prior art will be briefly described below. Obviously, presented in the accompanying drawings are merely some embodiments of the present disclosure. Other accompanying drawings can be obtained by one of ordinary skill in the art based on these drawings without paying creative effort.

Figure 1:
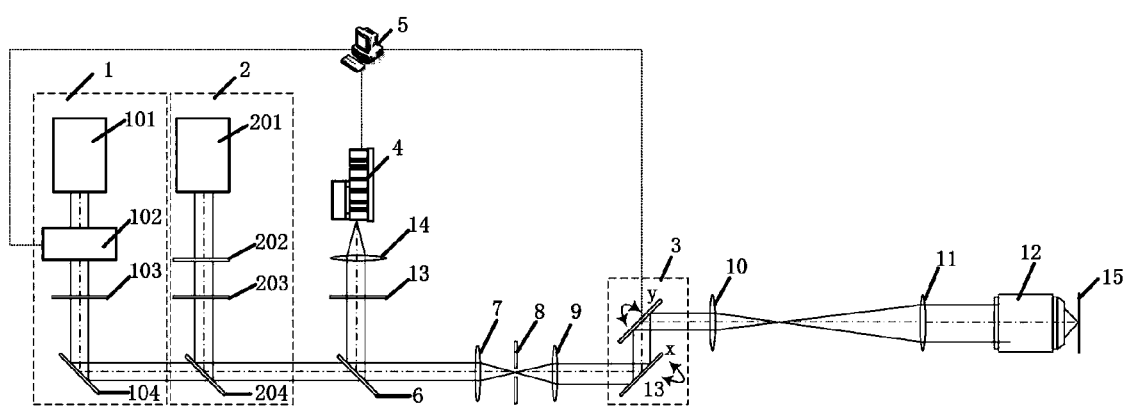
FIG. 1 is a schematic diagram of a point-scanning structured illumination-based super-resolution microscopic imaging system according to an embodiment of the present disclosure.

In the drawings: 1, first laser assembly; 2, second laser assembly; 3, scanner; 4, detector; 5, computing terminal; 6, second beam splitter; 7, first objective lens; 8, pinhole; 9, second objective lens; 10, scanning lens; 11, tube lens; 12, third objective lens; 13, emission filter; 14, first optical lens; 15, to-be-imaged sample; 101, first laser; 102, intensity modulator; 103, first excitation filter; 104, first reflector;

201, second laser; 202, vortex phase plate; 203, second excitation filter; and 204, first beam splitter.

DETAILED DESCRIPTION OF EMBODIMENTS

To make the objects, technical solutions and advantages of the present disclosure clearer and better understood, the present disclosure will be described in detail below with reference to the accompanying drawings and embodiments. It should be understood that the embodiments described herein are only for explaining the present disclosure and are not intended to limit the present disclosure.

As used herein, unless otherwise specified, the terms "one" and "the" may refer to a singular form or a plural form.

In addition, as used herein, the terms "first" and "second" are only used for description, rather than indicating or implying their relative importance or implicitly specifying the number of the indicated technical features. As a result, a feature defined with "first" or "second" may expressly or implicitly include at least one such feature. Moreover, the technical solutions of various embodiments may be combined with each other as long as the combined technical solution can be implemented by one of ordinary skill in the art. When the combination of technical solutions is contradictory or cannot be implemented, it should be considered that such a combination does not exist and is out of the protection scope of the present disclosure.

To break through the diffraction limit on the resolution of fluorescence microscopy, a series of novel super-resolution microscopic imaging methods have been proposed. For example, Rust group has proposed a stochastic optical reconstruction microscopy (STORM) technique. By controlling the sparse luminescence of fluorescent molecules, no two molecules will emit light at the same time within the diffraction limit to avoid indistinguishable situations. The position of each fluorescent molecule can be obtained through multiple imaging and localization to reconstruct super-resolution images. The imaging resolution of this method can reach a level higher than 20 nm in the lateral direction and 50 nm in the axial direction. However, it requires 10,000 original images in average to reconstruct a super-resolution image, which limits the imaging speed. Besides, it also requires fluorescent probes with switching effect and has high requirements for dyes, which limits its scope of application.

The Hell's research group has proposed a stimulated emission depletion (STED) technique, which uses a high-intensity ring STED light around the excitation light to make the fluorescent molecules within the diffraction limit, except for the centre point, to undergo stimulated emission without fluorescence. This is equivalent to drastically reducing the size of the point spread function (PSF) of the system, so as to obtain super-resolution images. With the introduction of STED light, the resolution can be dramatically increased to a level much higher than the diffraction-limited resolution (tens of nanometers or even higher), and the higher the resolution of the system, the higher the power of the STED light required. However, the high-power STED light damages to biological samples, especially living cells. Therefore, this method is not suitable for dynamic imaging of living cells. Besides, it requires special STED dyes, which limits the range of samples.

Gustafsson's group has proposed a structured illumination microscopy (SIM) technique, in which the high-frequency information that would otherwise not be able to pass through the system is translated into the observable frequency range by using Moore's stripes to achieve the super-resolution imaging. Specifically, the periodic structured illumination is used to stimulate samples, so that a multi-level spectrum carrying object information is generated in the frequency domain due to the convolution of the structured illumination spectrum and the object spectrum, which is then subjected to post-data processing to be separated, so as to obtain high-frequency information of the samples, thereby achieving super-resolution imaging. As the spatial frequency of the structured illumination is limited by the excitation optical transfer function, it is at most the cut-off frequency of the excitation optical transfer function. Therefore, the imaging resolution is improved by 2 times at most by using this method.

To improve the resolution of SIM, Gustafsson's group proposes a super-resolution saturated structured illumination microscopy (SSIM) technique based on the SIM, which utilizes saturated excitation of fluorescent molecules to make the sample emit non-sinusoidal distribution structured fluorescence with higher-order frequency components under the sinusoidal light-wave excitation, thus expanding the multistage spectral and improving the resolution to a level of tens of nanometers. However, this method requires very high optical power to achieve saturated excitation of fluorescent molecules, and is therefore not suitable for live cell imaging and cannot exert advantage of SIM.

To overcome the problems in the prior art, for example, the existing STORM imaging speed is slow, the STED super-resolution technique requires an increased STED optical power to improve the imaging resolution, and the existing structured illumination super-resolution technique needs saturated excitation to improve the imaging resolution and cannot realize tens of nanometers or even higher-resolution under the condition of low-power excitation, the present application discloses a point-scanning structured illumination-based super-resolution microscopic imaging system, as shown in FIG. 1, which includes a first laser assembly 1, a second laser assembly 2, a scanner 3, a detector 4 and a computing terminal 5. The first laser assembly 1 is configured to generate an excitation light whose intensity varies sinusoidally with time. The second laser assembly 2 is configured to generate an annular STED light. The scanner 3 is configured to control the excitation light and the annular STED light to scan and excite a to-be-imaged sample 15 to generate fluorescence signals. The detector 4 is configured to acquire the fluorescence signals to obtain a plurality of fluorescence-structured images in different orientations and phase. The computing terminal 5 is configured to extract a frequency component of each of the fluorescence-structured images, reconstruct a plurality of local super-resolution images of the to-be-imaged sample 15 in different orientations based on the frequency component, and synthesize an integral super-resolution image of the to-be-imaged sample 15 based on the plurality of local super-resolution images.

Specifically, the first laser assembly 1 and the second laser assembly 2 respectively generate excitation light with intensity varying sinusoidally with time and annular STED light to be irradiated onto the to-be-imaged sample 15 through the scanner 3. Then the to-be-imaged sample 15 is excited to generate fluorescence signals, and the fluorescence signals are collected by the detector 4. In this embodiment, the excitation light intensity modulation, beam scanning and fluorescence signal detection are carried out synchronously, and the detector 4 continuously records point by point to form a fluorescence-structured image. By changing the phase of the modulation function and repeating the above steps, a plurality of fluorescence-structured images in different orientations and phase can be obtained. A frequency component of each fluorescence-structured image are then extracted by the computing terminal 5, and a plurality of local super-resolution of the to-be-imaged sample 15 images in different orientations are reconstructed according to the frequency component. Then, the plurality of local super-resolution images are synthesized into an integral super-resolution image of the to-be-imaged sample 15. When the to-be-imaged sample 15 is scanned and excited by the excitation light and the annular STED light, the excited fluorescent molecules in the annular STED light region rapidly fall back to the ground state due to excited radiation and cannot emit fluorescent signals, and only the fluorescent molecules in the central region of the excitation light can emit fluorescent signals. In this way, a stripe structured-light image exceeding the diffraction limit can be obtained, and the spacing of adjacent stripes in the stripe structured-light image is the same as the revolution of the STED microscope. In the meanwhile, the fluorescence signals are collected by the detector 4, and the resolution of the final super-resolution image is two times higher than that of the STED microscope.

Further, the first laser assembly 1 includes a first laser 101, an intensity modulator 102, a first excitation filter 103, and a first reflector 104. The first laser 101 is configured to generate a first laser light. The intensity modulator 102 is configured to modulate the first laser light into an excitation light whose intensity varies sinusoidally with time. The first excitation filter 103 is configured to filter the excitation light. The first reflector 104 is configured to reflect the excitation light after filtered by the first excitation filter 103 to the scanner 3. Specifically, the first laser generated by the first laser 101 is modulated by the intensity modulator 102 to obtain the excitation light whose intensity varies sinusoidally with time, and then the excitation light is filtered by the first excitation filter 103 to block the background light other than the excitation light, and reflected to the scanner 3 through the first reflector 104.

Specifically, the modulation function of the intensity modulator 102 is $$I_{ex}(r) = \frac{1}{2}[1 + \cos(\omega_t t \pm \varphi)],$$

where $I_{ex}(r)$ represents an excitation light intensity on an imaging plane of a to-be-imaged sample; r represents an arbitrary position on the to-be-imaged sample; $\omega_t$ represents a time modulation frequency; t represents time; and $\varphi$ represents an initial phase. To simplify the modulation function, letting $\varphi=0$, then the modulation function is simplified as $$I_{ex}(r) = \frac{1}{2}[1 + \cos(\omega_t t)].$$

The modulated excitation light intensity satisfies $$I_{ex}(r) = \frac{1}{2}[1 + \cos(\omega_t t)].$$

The to-De-imaged sample is subjected to scanning excitation by the excitation light and the annular STED light to generate fluorescence signals having a light intensity of $$I_{em}(r) = \frac{1}{2}[1 + \cos(\omega_t t)].$$

Specifically, the scanner 3 is a two-dimensional scanner. When scanning the to-be-imaged sample 15, the scanner 3 performs a point-by-point scanning along a longitudinal direction of the to-be-imaged sample 15. After the longitudinal scanning is completed, the scanner 3 performs a point-by-point scanning along a transverse direction of the to-be-imaged sample 15. The point-by-point scanning is repeated until the to-be-imaged sample 15 is completely scanned. The computing terminal 5 is connected to the intensity modulator 102, the detector 4 and the scanner 3. The computing terminal 5 is configured to synchronously control the intensity modulator 102 to modulate the intensity of the excitation light. The scanner 3 is configured to scan the to-be-imaged sample 15. The detector 4 is configured to acquire the fluorescent signals. The imaging system provided herein has a high imaging speed.

Further, the second laser assembly 2 includes a second laser 201, a vortex phase plate 202, a second excitation filter 203 and a first beam splitter 204. The second laser 201 is configured to generate a second laser light. The vortex phase plate 202 is configured to modulate a second laser light into an annular STED light. The second excitation filter 203 is configured to filter the annular STED light. The first beam splitter 204 is configured to reflect the annular STED light after filtered by the second excitation filter 203 to the scanner 3. Specifically, the second laser light generated by the second laser 201 is modulated into the annular STED light by the vortex phase plate 202, and the annular STED light is filtered by the second excitation filter 203 to block background light other than the annular STED light, and is reflected by the first beam splitter 204 to the first beam splitter 3.

In an embodiment, the imaging system further includes a first objective lens 7, a pinhole 8 and a second objective lens 9. The first objective lens 7 is configured to converge the excitation light reflected by the first reflector 104 and the annular STED light reflected by the first beam splitter 204 to the pinhole 8. The pinhole 8 is configured to perform spatial filtering on the excitation light and the annular STED light converged by the first objective lens 7. The second objective lens 9 is configured to collimate the excitation light and the annular STED light after the spatial filtering onto the scanner 3. Specifically, the excitation light is reflected by the first reflector 104 and transmitted by the first beam splitter 204, and is converged with the annular STED light reflected by the first beam splitter 204. After that, the excitation light and the annular STED light are converged by the first objective lens 7 to the pinhole 8 for spatial filtering, and then collimated into a parallel light by the second objective lens 9 to the scanner 3 for scanning the to-be-imaged sample 15 line by line.

Further, the imaging system provided herein further includes a scanning lens 10, a tube lens 11 and a third objective lens 12. The scanning lens 10 is configured to receive and expand the excitation light and the annular STED light emitted from the scanner 3 to emit an expanded excitation light and an expanded annular STED light. The tube lens 11 is configured to receive and collimate the expanded excitation light and the expanded annular STED light to emit a collimated excitation light and a collimated annular STED light. The third objective lens 12 is configured to receive the collimated excitation light and the collimated annular STED light and focus the collimated excitation light and the collimated annular STED light onto the to-be-imaged sample 15 for excitation to produce a fluorescence signal. Specifically, the excitation light and annular STED light emitted from the scanner 3 is focused by the third objective lens 12 to excite the to-be-imaged sample 15 to emit the fluorescence signal after passing through the scanning lens 10 and the tube lens 11. The excited molecules in the region of the annular STED light rapidly fall back to the ground state due to the excited radiation and are thus unable to emit fluorescence signals, while only the fluorescent molecules in the region of the center of the excitation light emit fluorescence signals. In such cases, a stripe structured-light image beyond the diffraction limit can be obtained, and the spacing of adjacent stripes in the stripe structured-light image is the same as the resolution of the STED microscopy.

In an embodiment, the imaging system further includes a second beam splitter 6. The second beam splitter 6 is configured to reflect the fluorescence signals generated by the to-be-imaged sample 15 to the detector 4. Specifically, the fluorescence signals generated by the to-be-imaged sample 15 through scanning excitation by the excitation light and the annular STED light are collected by the third objective lens 12, and successively pass through the tube lens 11, the scanning lens 10, the scanner 3, the second objective lens 9, the pinhole 8 and the first objective lens 7 to the second beam splitter 6. Then the second beam splitter 6 reflects the fluorescence signals to the detector 4.

In an embodiment, the imaging system further includes an emission filter 13 and a first optical lens 14. The emission filter 13 is configured to filter the fluorescent signals reflected by the second beam splitter 6. The first optical lens 14 is configured to converge the filtered fluorescent signals to the detector 4. Specifically, the second beam splitter 6 reflects the fluorescent signals generated by the to-be-imaged sample 15 to the emission filter 13. After the emission filter 13 blocks the background light other than the fluorescent signals, the fluorescent signals filtered by the emission filter 13 is converged by the first optical lens 14 to the detector 4, and the detector 4 records the light intensity of the fluorescent signals.

Figure 2:
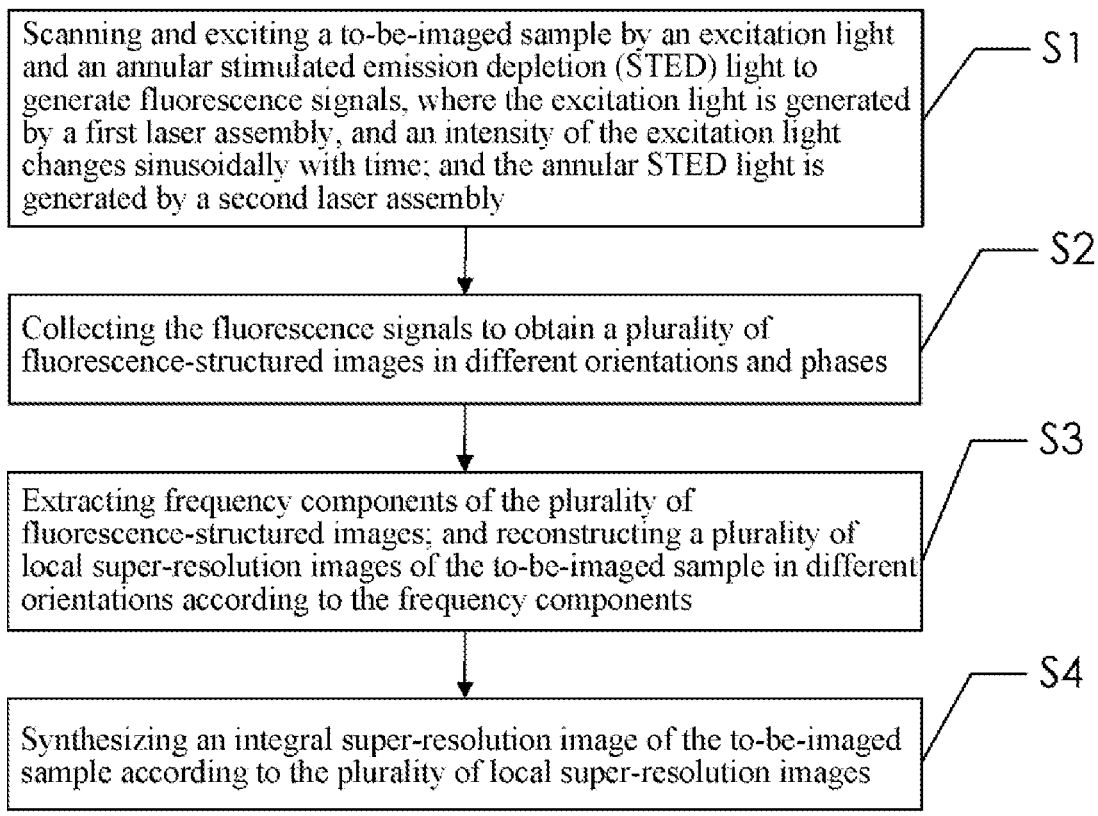
FIG. 2 is a flowchart of a point-scanning structured illumination-based super-resolution microscopic imaging method according to an embodiment of the present disclosure.

Based on the aforementioned system, this application also discloses a point-scanning structured illumination-based super-resolution microscopic imaging method, as shown in FIG. 2. The method includes the following steps.

(S1) A to-be-imaged sample is scanned and excited by an excitation light generated by a first laser assembly and an annular STED light generated by a second laser assembly to generate fluorescence signals, where an intensity of the excitation light changes sinusoidally with time.

(S2) The fluorescence signals generated by the to-be-imaged sample are collected to obtain a plurality of fluorescence-structured images in different orientations and phases.

(S3) Frequency components of each of the plurality of fluorescence-structured images are extracted. A plurality of local super-resolution images of the to-be-imaged sample in different orientations are reconstructed according to the frequency components.

(S4) An integral super-resolution image of the to-be-imaged sample is generated according to the plurality of local super-resolution images.

In an embodiment, an excitation light whose intensity varies sinusoidally with time is generated by a first laser assembly, and an annular STED light is generated by a second laser assembly. A to-be-imaged sample is scanned and excited by the excitation light and the annular STED light to generate fluorescence signals. The excited molecules in the region of the annular STED light will fall back to the ground state rapidly due to the excited radiation, and therefore cannot generate fluorescence signals. Only the fluorescent molecules in the region of the center of the excitation light emit fluorescence signals, so that a stripe structured-light image exceeding the diffraction limit can be obtained, and the spacing of adjacent stripes in the stripe structured-light image is the same as the resolution of the STED microscopy. By changing the period and initial phase of the modulation function of the excitation light, a number of fluorescence-structured images in different orientations and phases can be obtained. The wide-spectrum (WS) reconstruction algorithm is used to reconstruct the local super-resolution images with the corresponding orientation, and then the local super-resolution images of each orientation are synthesized to form an integral super-resolution image, i.e., an integral super-resolution image of the to-be-imaged sample. The WS reconstruction algorithm is a generalized structured illumination super-resolution reconstruction algorithm, which is not only applicable to linear structured illumination super-resolution image reconstruction, but also applicable to nonlinear structured illumination and saturated excitation structured illumination super-resolution image reconstruction.

In an embodiment, step (S3) includes the following steps.

(S31) The frequency components of each of the plurality of fluorescence-structured images are extracted. The frequency components of the fluorescence-structured images with the same orientation are reset and linearly integrated to obtain integrated frequency component values of the fluorescence-structured images in different orientations.

(S32) A Fourier inverse transform is performed on each of the integrated frequency component values to obtain a plurality of local super-resolution images of the to-be-imaged sample in different orientations.

In an embodiment, it is assumed that the modulation function of the excitation light is $$I_{ex}(r) = \frac{1}{2}[1 + \cos(\omega_t t \pm \varphi)],$$

where $I_{ex}(r)$ represents an intensity of the excitation light on an imaging plane of the to-be-imaged sample; r represents an arbitrary position on the to-be-imaged sample; $\omega_t$ represents a time modulation frequency; t represents time; and $\varphi$ represents an initial phase. The intensity of the fluorescence signal generated by the to-be-imaged sample after the scanning excitation of the excitation light and the annular STED light is expressed as $$I_{em}(r) = \frac{1}{2}[1 + \cos(\omega_t t \pm \varphi)].$$

Generally, the fluorescence-structured image under an orientation needs to obtain the fluorescence-structured image at the phase of at least $$\varphi_m = 0, \frac{\pi}{3}, \frac{2\pi}{3}.$$

The fluorescence signal passes through the fluorescence-structured image formed by the detector through point-by-point recording to generate Fourier transformations, expressed as:

$$\begin{bmatrix} I_1(k) \\ I_2(k) \\ I_3(k) \end{bmatrix} = \frac{1}{2} * \begin{bmatrix} 1 & e^{-i\varphi 1} & e^{i\varphi 1} \\ 1 & e^{-i\varphi 2} & e^{i\varphi 2} \\ 1 & e^{-i\varphi 3} & e^{i\varphi 3} \end{bmatrix} \begin{bmatrix} S(k) \\ S(k-k_p) \\ S(k+k_p) \end{bmatrix} * OTF(k).$$

By acquiring the fluorescence-structured image at the phase of $$\varphi_m = 0, \frac{\pi}{3}, \frac{2\pi}{3},$$

the frequency components $S(k)$, $S(k-k_p)$, and $S(k+k_p)$ can be solved, and the frequency components are reset and linearly integrated to obtain integrated values of the frequency components of the fluorescence-structured images in different orientations. Finally, the integrated values are converted to the time domain, namely, the integrated values are inverted by Fourier transform, so that a plurality of local super-resolution images of the to-be-imaged samples in different orientations are obtained.

In summary, this application provides a point-scanning structured illumination-based super-resolution microscopic imaging system and method. The system includes a first laser assembly, a second laser assembly, a scanner, a detector and a computing terminal. The first laser assembly is configured to generate an excitation light whose intensity varies sinusoidally with time. The second laser assembly is configured to generate an annular STED light. The scanner is configured to control the the excitation light and the annular STED light to scan and excite a to-be-imaged sample to generate fluorescence signals. The detector is configured to acquire the fluorescence signals generated by the to-be-imaged sample to obtain a number of fluorescence-structured images varied in orientations and phases. The computing terminal is configured to extract frequency components of each of the fluorescence-structured images, reconstruct a plurality of local super-resolution images of the to-be-imaged sample in different orientations based on the frequency components, and synthesize an integral super-resolution image of the to-be-imaged sample based on the plurality of local super-resolution images. In this application, a to-be-imaged sample is scanned and excited by an excitation light whose intensity varies sinusoidally with time and an annular STED light to obtain a stripe structured-light image exceeding the diffraction limit. A detector is configured to synchronously collect the fluorescence signal point by point in real time, and super-resolution images are reconstructed through the algorithm. Compared with the STORM technology, this method provided herein has a faster imaging speed. Compared with the STED technology, the method provided herein can improve the resolution by 2 times. Compared with the structured illumination super-resolution technology, the method provided herein does not require saturated excitation, and can achieve tens of or even several nano-meters resolution, that is, the method provided herein can achieve tens of nano-meters or even higher resolution imaging under low power excitation conditions.

Described above are only preferred embodiments of the present disclosure, and are not intended to limit the present disclosure. Any modifications, equivalent substitutions, and improvements made within the spirit and principles of the present disclosure shall be included in the scope of the present disclosure defined by the appended claims.

What is claimed is:

1. A point-scanning structured illumination-based microscopic imaging system, comprising:
   a first laser assembly;
   a second laser assembly;
   a scanner;
   a detector; and
   a computing terminal;
   wherein the first laser assembly is configured to generate an excitation light whose intensity varies sinusoidally with time;
   the second laser assembly is configured to generate an annular stimulated emission depletion (STED) light;
   the scanner is configured to control the excitation light and the annular STED light to scan and excite a to-be-imaged sample to generate fluorescence signals;
   the detector is configured to acquire the fluorescence signals to obtain a plurality of fluorescence-structured images in different orientations and phase; and
   the computing terminal is configured to extract a frequency component of each of the plurality of fluorescence-structured images, reconstruct a plurality of local super-resolution images of the to-be-imaged sample in different orientations based on the frequency component, and synthesize an integral super-resolution image of the to-be-imaged sample based on the plurality of local super-resolution images.

2. The point-scanning structured illumination-based microscopic imaging system of claim 1, wherein the first laser assembly comprises a first laser, an intensity modulator, a first excitation filter, and a first reflector;
   the first laser is configured to generate a first laser light;
   the intensity modulator is configured to modulate the first laser light into the excitation light whose intensity varies sinusoidally with time;
   the first excitation filter is configured to filter the excitation light; and
   the first reflector is configured to reflect the excitation light after filtered by the first excitation filter to the scanner.

3. The point-scanning structured illumination-based microscopic imaging system of claim 2, wherein the second laser assembly comprises a second laser, a vortex phase plate, a second excitation filter and a first beam splitter;
   the second laser is configured to generate a second laser light;
   the vortex phase plate is configured to modulate the second laser light into the annular STED light;
   the second excitation filter is configured to filter the annular STED light; and
   the first beam splitter is configured to reflect the annular STED light after filtered by the second excitation filter to the scanner.

4. The point-scanning structured illumination-based microscopic imaging system of claim 3, further comprising:
   a first objective lens;
   a pinhole; and
   a second objective lens;
   wherein the first objective lens is configured to converge the excitation light reflected by the first reflector and the annular STED light reflected by the first beam splitter to the pinhole;

the pinhole is configured to perform spatial filtering on the excitation light and the annular STED light converged by the first objective lens; and the second objective lens is configured to collimate the excitation light and the annular STED light after the spatial filtering onto the scanner.

5. The point-scanning structured illumination-based microscopic imaging system of claim 1, further comprising:
a scanning lens;
a tube lens; and
an objective lens;
wherein the scanning lens is configured to receive and expand the excitation light and the annular STED light emitted from the scanner to emit an expanded excitation light and an expanded annular STED light;
the tube lens is configured to receive and collimate the expanded excitation light and the expanded annular STED light to emit a collimated excitation light and a collimated annular STED light; and
the objective lens is configured to receive the collimated excitation light and the collimated annular STED light, and focus the collimated excitation light and the collimated annular STED light onto the to-be-imaged sample for excitation to produce the fluorescence signals.

6. The point-scanning structured illumination-based microscopic imaging system of claim 5, further comprising:
a beam splitter;
wherein the beam splitter is configured to reflect the fluorescence signals to the detector.

7. The point-scanning structured illumination-based microscopic imaging system of claim 6, further comprising:
an emission filter; and
a lens;
wherein the emission filter is configured to filter the fluorescence signals reflected by the beam splitter; and
the lens is configured to converge filtered fluorescence signals to the detector.

8. The point-scanning structured illumination-based microscopic imaging system of claim 2, wherein a modulation function of the intensity modulator is $$I_{ex}(r) = \frac{1}{2}[1 + \cos(\omega_t t \pm \varphi)];$$

wherein $I_{ex}(r)$ represents an intensity of the excitation light on an imaging plane of the to-be-imaged sample; r represents an arbitrary position on the to-be-imaged sample; $\omega_t$ represents a time modulation frequency; t represents time; and $\varphi$ represents an initial phase.

9. A point-scanning structured illumination-based s microscopic imaging method, comprising:
(S1) scanning and exciting, by an excitation light generated by a first laser assembly and an annular STED light generated by a second laser assembly, a to-be-imaged sample to generate fluorescence signals, wherein an intensity of the excitation light changes sinusoidally with time;
(S2) collecting the fluorescence signals to obtain a plurality of fluorescence-structured images in different orientations and phases;
(S3) extracting frequency components of the plurality of fluorescence-structured images; and reconstructing a plurality of local super-resolution images of the to-be-imaged sample in different orientations according to the frequency components; and
(S4) synthesizing an integral super-resolution image of the to-be-imaged sample according to the plurality of local super-resolution images.

10. The point-scanning structured illumination-based microscopic imaging method of claim 9, wherein step (S3) comprises:
(S31) extracting the frequency components of the plurality of fluorescence-structured images; resetting and linearly integrating frequency components of images of the same orientation among the plurality of fluorescence-structured images to obtain integrated frequency component values of the plurality of fluorescence-structured images; and
(S32) performing a Fourier inverse transform on each of the integrated frequency component values to obtain the plurality of local super-resolution images of the to-be-imaged sample in different orientations.

* * * * *